United States Patent Office 2,973,390
Patented Feb. 28, 1961

2,973,390

PROCESS FOR PREPARING 1-ETHYNYLCYCLO-HEXANOL AND HOMOLOGUES

John J. Nedwick and Warren H. Watanabe, Philadelphia, Pa., assignors to Rohm & Haas Company, Philadelphia, Pa., a corporation of Delaware No Drawing. Filed Sept. 13, 1957, Ser. No. 683,680

12 Claims. (Cl. 260—631)

This invention relates to an improved process for the production of ethynyl carbinols by a catalytic ethynylation reaction. More specifically, the invention is concerned with the production of ethynylcyclohexanol type compounds from acetylene and cyclohexanone or substituted cyclohexanones employing alkali metal hydroxides as promoters of the reaction. The reaction is carried out entirely in the liquid phase under such high pressures that the reactant acetylene, which is introduced into the reaction zone as a liquid solution, is maintained in the solvated form throughout the course of the reaction.

Processes have been known for the production of acetylenic alcohols. For example, U.S. Patent 2,163,720 discloses the reaction of a saturated ketone with an alkali metal hydroxide, followed by treatment of the resulting addition product with acetylene to obtain acetylenic glycols and alkynyl carbinols. U.S. Patent 2,302,345 teaches that alcohols and glycols of the acetylene series can be prepared more directly by bringing into contact gaseous acetylene with a mixture of acetone and an aqueous solution having an alkaline reaction. U.S. Patent 2,712,560 describes the ethynylation of formaldehyde using acetylene dissolved in a suitable solvent and a solid heavy metal catalyst. However, that process is not satisfactory for the commercial production of ethynyl carbinols derived from ketones. These and other methods of catalytic ethynylation have not been found satisfactory for the preparation of ethynylcyclohexanol type compounds because, instead of obtaining commercially practicable yields of the desired carbinol, the product obtained contains an undesirably large amount of glycol and because the rate of conversion to products is undesirably slow.

The present invention is based, in important part, upon the discovery that if the concentration of acetylene is raised to a high level in comparison with that of the ketone, much higher than it has ever been employed in such a reaction before, not only is there obtained a faster reaction and higher conversion, but there is an entirely different distribution of products than is obtained with prior art processes. In accordance with the present invention, the glycol, which is one of the two "normal" products of the acetylene plus ketone reaction, is suppressed to a very low level; the carbinol, which is the other "normal" product, is obtained almost exclusively at production rates averaging over a hundred times as much as the best of the prior art processes.

In the prior art where gaseous acetylene was pressed into the reaction vessel, the concentration of acetylene in the liquid reaction mixture, the actual site of reaction, was limited by the solubility of acetylene in the reaction mixture at the temperature and pressure of reaction. This results in a low ratio of acetylene to ketone, on the order of 0.1 mole or less of acetylene per mole of ketone, in the reaction mixture. Reaction is slow and competing reactions lead to low yields of the acetylenic alcohol. In the present invention, we have a minimum of ten times that amount of acetylene, namely 1 mole or more of acetylene per mole of ketone, present in the liquid reaction mixture when it is brought to reaction conditions. The use of such relatively high concentrations of acetylene in the base catalyzed ketone ethynylation reaction permits operation at higher temperatures than have been employed previously and thus a much higher rate of reaction is achieved without, at the same time, obtaining excessive undesirable side reactions such as the base-catalyzed, self-condensation of ketones.

In the prior art methods for producing acetylenic alcohols from ketones, when just the vapor phase system of introducing acetylene was known, there existed only a choice of several evils. The reaction could not be carried out at the high temperatures required to speed the process because, aside from the dangers of explosion inherent in heating the gaseous acetylene, it caused excessive side reactions such as the condensation of ketone mentioned earlier. If the temperature was kept low, it took very long periods of time to get satisfactory ethynylation results and, moreover, caused an increase in glycol formation at the expense of carbinol. In practicing the present invention, use is made of a condensed phase process which consists in dissolving acetylene in a suitable liquid phase prior to introducing it into a reactor at a pressure sufficiently high to maintain the reactants completely in the liquid phase. The condensed phase technique has made it possible to employ high temperatures without concern over explosions. We have now found, moreover, that when the base-catalyzed ethynylation reaction of acetylene and an appropriate ketone is carried out in the condensed or liquid phase, even though high temperatures are employed there are substantially no objectionable side reactions such as were obtained when the reaction is performed at equivalent temperatures with the gaseous phase. Not only that, but we have additionally found that with the condensed phase and the higher temperatures made usable thereby it is now possible to speed up the reaction considerably, to obtain far greater yields, and selectively to produce carbinol over glycol in very satisfactory production quantities. An illustration of the improved results which the present invention has made possible over the prior art will be seen in the following comparison of data from two ethynylation reactions involving cyclohexanone, one by the gaseous technique and the other by our completely liquid-phase system.

TABLE I

| | Present Invention Liquid Phase | Prior Art Gaseous Phase |
|---|---|---|
| Temperature, ° C | 135 | 85 |
| Reaction Time, hours | 0.17 | 8-10 |
| Percent Conversion, carbinol | 52 | 7.9 |
| Percent Yield, carbinol | 70 | |
| Percent Conversion, glycol | 7.5 | 17.7 |
| Percent Yield, glycol | 10.3 | |
| Percent Total conversion to products | 59.5 | 25.6 |
| Ratio, carbinol to glycol | 6.9 | 0.45 |
| Production Rate a | 2.4 | 0.015 | a (Volume ketone converted to products per hour per volume of reactor space.)

It had been suggested, prior to our present invention, that the liquid or condensed phase ethynylation process could be carried out by reacting acetylene with either a ketone or an aldehyde using a solid heavy metal catalyst such as copper acetylide. Investigation has shown, however, that this reaction will not work to any significant degree with ketones when such catalysts are employed, although it does work quite well with aldehydes. We have now found that this reaction with ketones will only function to give commercially useful yields when the catalyst used is a base such as potassium or sodium hydroxide.

We have further found that this reaction, even with the base catalyst, will not work with all ketones to an appreciable degree as the equilibrium between carbinol and ketone plus acetylene may be unfavorable and the base catalyzed condensation becomes competitive with the ethynylation. The resulting yields, as well as conversions, are lowered. By sharp contrast, we have discovered that one family of ketones, namely cyclohexanone and substituted cyclohexanones, works exceptionally well in this reaction to form 1-ethynylcyclohexanol and its homologues with percentages of conversion and yield which are far higher than were ever attainable previously, by virtue of which the process has now become a highly practicable and productive one, suitable for commercial operation. An illustration of the effectiveness of the cyclohexanones in comparison with some other ketones in the ethynylation reaction will be seen from Table II below:

TABLE II

| Ketone | Wt. Percent Solvent Me(OH) | Wt. Percent Catalyst (KOH) | $C_2H_2$/ Ketone | Temp., °C. | Cont. Time (mins.) | Acetylenic Alcohol | |
|---|---|---|---|---|---|---|---|
| | | | | | | Percent Conv. | Percent Yield |
| Acetone | 35 | 1.1 | 1.1 | 130 | 9.5 | 15.2 | 33 overall |
| Do | 35 | 1.1 | 1.4 | 100 | 10.0 | 3.9 | 13.6 |
| Methyl ethyl ketone | 35 | 1.1 | 1.1 | 130 | 10.0 | 8.4 | 28 |
| Acetophenone | 35 | 1.1 | 1.1 | 130 | 10.0 | no reaction | |
| α-Tetralone | 50 | 2.0 | 3.7 | 140 | 10.0 | no reaction | |
| Cycloheptanone | 50 | 2.0 | 3.1 | 140 | 10.0 | 3.6 | 17.0 |
| Cyclohexanone | 27 | 1.2 | 1.6 | 170 | 4.0 | 31.2 | 46.0 |
| Do | 27 | 1.2 | 1.8 | 135 | 10.0 | 52.0 | 70.0 |
| Do | 27 | 1.3 | 2.0 | 120 | 22.0 | 40.0 | 69.8 |
| 3-Methyl-cyclohexanone | 50 | 2.0 | 3.0 | 140 | 11.0 | 46.9 | 85.6 |
| 2-Methyl-cyclohexanone | 50 | 2.0 | 3.2 | 140 | 9.7 | 30.0 | 63.0 |
| 3,3,5-Trimethylcyclo-hexanone | 50 | 2.0 | 4.0 | 140 | 10.6 | 8.0 | 64.0 |
| 4-tert-Octylcyclohexanone | 50 | 2.0 | 4.7 | 140 | 10.0 | 35.7 | 54.0 |

Set forth below are a number of examples which fully describe the method of the present invention and give the details of the experiments by which the data in Table II was obtained. However, some general comments on the method beforehand will be in order to assist all those interested in practicing this invention.

In the first place, acetylene gas is not handled at elevated temperatures, nor need it be diluted. It is dissolved in the cold reaction mixture under superatmospheric pressures, preferably from 100 to 500 p.s.i.g. with the exercise of the usual precautions except that dilution with gas or vapor is unnecessary at the absorbing temperature used, usually between −20 and 30° C. Even higher pressures may be used, but normally they are not needed to get the required amount of acetylene into solution. Lower temperatures may be employed to increase the solubility of the acetylene short of the freezing point, but generally it is not economical to go below the indicated preferred limits. Higher temperatures are usable also, but again are not desirable because of the dangers involved in the lowering of the acetylene solubility and the fact that the ethynylation reaction may be started before all the acetylene is dissolved. Enough acetylene is dissolved in the reaction mixture to provide at least one mole per mole of ketone present. Higher concentrations will give improved yields and conversions of ketone to carbinol. The excess acetylene can be recovered and recycled. A concentration of from 1.1 to 3 moles of acetylene per mole of ketone is preferred.

The reaction mixture is a homogeneous, one-phase liquid consisting of ketone, an auxiliary solvent such as methyl alcohol, ethyl alcohol, isopropyl alcohol, or some other lower alkanol which helps to solubilize the catalyst and is also a good solvent for acetylene, and a dissolved strongly basic catalyst such as potassium hydroxide. The ketone constitutes approximately 20 to 70% of the total charge, the upper limit being that at which the catalyst is no longer soluble in the charge. The alcohol is required to provide catalyst solubility and, together with the ketone, must provide adequate acetylene solubility. If desired, a third liquid component which is primarily a good acetylene solvent (and not necessarily a solvent for the base catalyst too) may be added to improve acetylene solubility. If such a third component is added, however, it must be one which will permit the entire charge to remain homogeneous. The catalyst constitutes 0.5 to 5 wt. percent of the total charge. As mentioned earlier, suitable catalysts are strongly alkaline derivatives of the alkali metals, sodium and potassium, namely potassium hydroxide and sodium hydroxide. A sodium or potassium alkoxide, such as sodium or potassium methoxide, ethoxide, butoxide, or ethoxyethoxide, is also satisfactory, as are strong organic bases such as benzyl trimethyl ammonium hydroxide.

As solvents for acetylene there may be employed, for example, dimethyl formal, diethyl formal, dimethyl acetal, diethyl acetal, dioxane, dioxolane, 2-methyl dioxolane, the monomethyl, dimethyl, monoethyl, diethyl, monopropyl, dipropyl, and butyl ethers of ethylene glycol, the dimethyl ethers of diethylene glycol, triethylene glycol, or tetraethylene glycol, tetrahydrofuran, ethyl ether, isopropyl ether, N-methyl pyrrolidone-2, dimethyl formamide, and dimethyl sulfoxide. Mixtures of two or more of such solvents may be used. The amount of solvent may vary from zero up to 50% or more of the reaction mixture. Of course, the best efficiency is had when the amount of solvent is kept to a minimum for absorbing the required amount of acetylene and for maintaining the mixture fluid at lowest temperature of absorption.

The mixture charged with acetylene is passed in liquid phase through a heating zone, where the reaction mixture is heated to a reacting temperature from about 100 to 170° C., preferably 120 to 150° C. under pressure sufficient to maintain the liquid phase. This requires pressures from about 1000 to 5000 p.s.i.g. Residence time in the heating zone is from about one to ten minutes. Longer times can be used, but usually without advantage. Generally, with a residence time of two to five minutes, the major portion of the ketone will have reacted cleanly. The balance may take up to eight minutes but ten minutes allows a reasonable factor of safety to assure that the process is complete.

In a convenient form of apparatus the reaction mixture is passed continuously through a heated tubular reactor. Reaction takes place with evolution of heat which is dissipated and the temperature controlled within the desired limits. In this manner of operation, it is possible to observe, with the aid of thermocouples, that reaction is very rapid and becomes essentially complete within the ten minute residence or contact time mentioned above.

The reaction mixture now is worked up by any suitable conventional method to give the ethynylcyclohexanol type product. Pressure is released. If desired, the mixture may be degassed. The volatile portions are distilled off and the product is purified.

The solvent used can be recycled. Unreacted ketone and the residue containing catalyst can be recycled with the addition of catalyst as needed, although from time to time at least portions of the residue must be withdrawn and replaced with fresh catalyst.

In the following examples, which are presented for purposes of illustration and not by way of limitation, additional details of procedure are presented. Parts are by weight unless otherwise designated. The examples, it will be noted, are summaries of the experiments which were performed to obtain the data set forth in Table II above.

*Example 1*

To a flask equipped with a stirrer there was charged 117 parts of methyl alcohol and 5.3 parts of potassium hydroxide. When all of the KOH had dissolved, there was added 294 parts of cyclohexanone. This solution was now charged to a suitable vessel and acetylene passed in until 143 parts had been absorbed. The pressure was 300 p.s.i.g. and the temperature 7° C.

This mixture was now passed through a tubular reactor maintained at 135° C., and a pressure (1500 p.s.i.g.) sufficient to prevent the desorption of acetylene. The contact time was 10.0 minutes.

The reactor effluent was collected continuously during the course of the reaction. When the reaction was completed, the entire reaction mixture was degassed and then vacuum flash-distilled at a pressure of 0.3 mm. and pot temperature to 100° C. The flash-distillate was fractionated through an appropriate column to recover methyl alcohol, 1-ethynyl cyclohexanol, cyclohexanone, and 1-2-bis(cyclohexanol-1)-ethyne. The product (1-ethynyl cyclohexanol) came over at 68–70° C./10 mm., $n_D^{25}$ 1.4802. Conversion was 52% and the yield 70%. The acetylenic glycol was recovered from the distillation bottoms by recrystallization from carbon tetrachloride. Conversion to the glycol (M.P. 107° C.) was 7.5% and the yield 10.3%. Overall yield of products, based on cyclohexanone, was 80.3%.

*Example 2*

The procedure was exactly the same as in Example 1 except that an equivalent amount of potassium methoxide was used in place of the potassium hydroxide, and an equivalent result was obtained.

*Example 3*

Procedure was the same as in Example 1 except that the temperature was 170° C. and the holding time 4.0 minutes. Conversion to 1-ethynyl-cyclohexanol was 31.2% and the yield 46%.

*Example 4*

The procedure was exactly the same as in Example 3 except that an equivalent amount of sodium methoxide was used in place of the potassium hydroxide, and an equivalent result was obtained.

*Example 5*

Procedure was the same as in Example 1 except that the temperature was 120° C. and the contact time 22.0 minutes. The conversion to 1-ethynyl-cyclohexanol was 40% and the yield 69.8%.

*Example 6*

To 200 parts of methyl alcohol there was added 8.2 parts of KOH. When all of the KOH had dissolved there was added 199 parts of 3-methyl cyclohexanone. This solution was now charged to an appropriate vessel and acetylene passed in until 130 parts were absorbed. The pressure was 250 p.s.i.g. and the temperature 12° C.

The acetylene mixture was now passed through a tubular reactor maintained at a temperature of 140° C. and a pressure of 1,700 p.s.i.g. The contact time was 11.0 minutes.

The reaction mixture was processed in the conventional manner, i.e. vacuum flash-distillation followed by fractionation.

The product, 1-ethynyl-3-methyl cyclohexanol, was obtained in 46.9% conversion and 85.6% yield.

The 1-ethynyl-3-methyl-cyclohexanol had a B.P. of 75–77° C. at 10 mm. The refractive index, $n_D^{25}$ was 1.4705. Analysis for acetylenic hydrogen indicated the material was 92% pure.

*Example 7*

Procedure was identical with Example 6 except for the starting material which in this instance was 2-methyl-cyclohexanone. Conversion to 1-ethynyl-2-methyl cyclohexanol was 30% and the yield 63%. The boiling point was 71–72° C./10 mm. Analysis for acetylenic hydrogen indicated material was 94% pure.

*Example 8*

Procedure was identical with Example 6 except for the starting material which in this instance was 4-t-octyl-cyclohexanone. Conversion to 1-ethynyl-4-tert octyl cyclohexanol was 35.7% and the yield 54%. The boiling point was 97° C./0.45 mm. Analysis indicates material was 80% pure.

*Example 9*

Procedure was identical with Example 6 except that 3,3,5-trimethyl-cyclohexanone was used as the starting material. Conversion to 1-ethynyl-3,3,5-trimethyl cyclohexanol was 8.0% and the yield 64%.

A variety of other ketones, aliphatic, cycloaliphatic and aromatic, were tried in similar fashion. As shown in Table II, the conversions and yields of product were much lower than in the case of cyclohexanone.

We claim:

1. A process for the production of 1-ethynyl-cyclohexanol and homologues thereof which comprises dissolving acetylene under a pressure of at least about 100 pounds per square inch and at a temperature up to about 30° C. in a liquid phase comprised of a mixture of (1) a ketone from the class consisting of cyclohexanone and alkyl-substituted cyclohexanones in which the alkyl group is in the range of $C_1$ to about $C_8$, (2) an alcohol from the group consisting of methanol, ethanol, and isopropanol, and (3) an ethynylation catalyst from the group consisting of sodium and potassium alkoxides in an amount which constitutes from about 0.5 to about 5.0 weight percent of the total charge, the amount of acetylene present being in the ratio of at least one mole per mole of the ketone, passing this reaction mixture through a reaction zone where the mixture is heated to at least about 100° C. under a pressure of at least 1,000 p.s.i.g. so as to prevent the formation of a vapor phase, and thereafter separating the ethynyl carbinol formed thereby from the effluent from the reaction zone.

2. The process of claim 1 in which the alcohol constitutes from about 10 to about 50% of the reaction mixture.

3. The process of claim 1 in which the ketone constitutes from about 20 to about 70% of the reaction mixture.

4. The process of claim 1 in which the ketone is present in an amount ranging from about 20% of the reaction mixture to an amount at which it is no longer soluble in the reaction charge.

5. A process for the production of ethynyl carbinols by the catalytic ethynylation of a ketone in which there is formed a major amount of the carbinol and only a minor amount of the corresponding acetylenic glycol, said process comprising dissolving from 1 to 3 moles of acetylene per mole of ketone in a liquid mixture of a ketone from the class consisting of cyclohexanone and alkyl-substituted cyclohexanones in which the alkyl group is in the range of $C_1$ to about $C_8$, an alcohol from the group consisting of methanol, ethanol and isopropanol, and an ethynylation catalyst from the group consisting of sodium and potassium alkoxides in an amount which constitutes from about 0.5 to about 5.0 weight percent of the total charge, the solution of acetylene being carried out at a pressure of from 100 to 500 lbs./in.$^2$ and a temperature up to about 30° C., reacting the acetylene-rich reaction mixture at a temperature of between 100° and 170° C. and a pressure between 1,000 and 5,000 lbs./in.$^2$, and thereafter recovering the ethynyl carbinol by separating it from the effluent of the reacted mixture.

6. The process of claim 5 additionally including in the reaction mixture an inert solvent for acetylene, the amount of which may be as much as 50% of the reaction mixture.

7. The process of claim 5 in which the residence time during which the reaction mixture is maintained at the elevated temperature is from about 2 to about 10 minutes.

8. The process of claim 5 in which the ketone used is cyclohexanone.

9. The process of claim 5 in which the ketone used is 2-methyl cyclohexanone.

10. The process of claim 5 in which the ketone used is 3-methyl cyclohexanone.

11. The process of claim 5 in which the ketone used is 3,3,5-trimethyl cyclohexanone.

12. The process of claim 5 in which the ketone used is 4-tert-octyl cyclohexanone.

References Cited in the file of this patent

UNITED STATES PATENTS

| | | |
|---|---|---|
| 2,302,345 | Pesta | Nov. 17, 1942 |
| 2,385,548 | Smith | Sept. 25, 1945 |
| 2,455,058 | Herman | Nov. 30, 1948 |
| 2,712,560 | McKinley et al. | July 5, 1955 |
| 2,858,344 | Kleinschmidt et al. | Oct. 28, 1958 |

FOREIGN PATENTS

| | | |
|---|---|---|
| 589,350 | Great Britain | June 18, 1947 |
| 1,091,401 | France | Oct. 27, 1954 |

OTHER REFERENCES

Reppe: "Acetylene Chemistry" (P.B. Report 18852-S), Charles A. Meyer and Co. Inc. (translation), 1949, N.Y., pages 82 and 83.